R. J. LEWERS.
EDUCATIONAL DEVICE.
APPLICATION FILED DEC. 29, 1919.

1,356,929.

Patented Oct. 26, 1920.

Inventor
Robert J. Lewers

UNITED STATES PATENT OFFICE.

ROBERT J. LEWERS, OF NEW YORK, N. Y.

EDUCATIONAL DEVICE.

1,356,929.  Specification of Letters Patent.  Patented Oct. 26, 1920.

Application filed December 29, 1919. Serial No. 347,952.

*To all whom it may concern:*

Be it known that I, ROBERT J. LEWERS, a citizen of the United States, residing at New York, in the county of New York and State of New York, have invented certain new and useful Improvements in Educational Devices, of which the following is a specification.

This invention relates to improvements in amusement devices for children and has for its object to provide an educational device so arranged as to instruct a child to read the time from a clock in both Roman and Arabic figures.

With the above and such other objects as may hereinafter more fully appear I have invented the device illustrated in the accompanying drawings in which—

Figure 1:
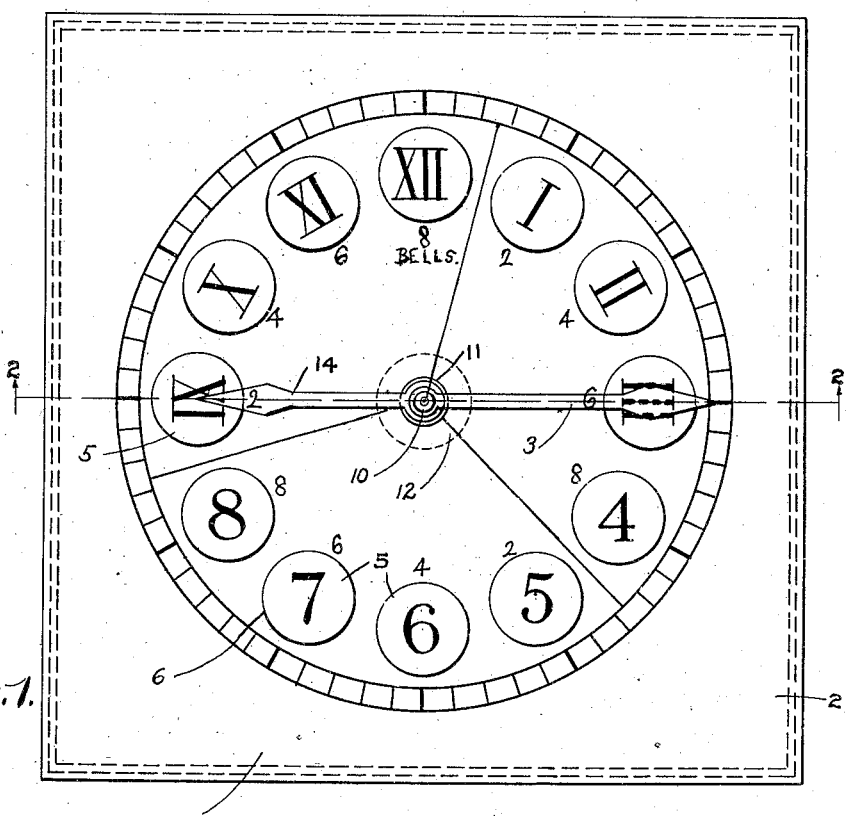
Figure 2:
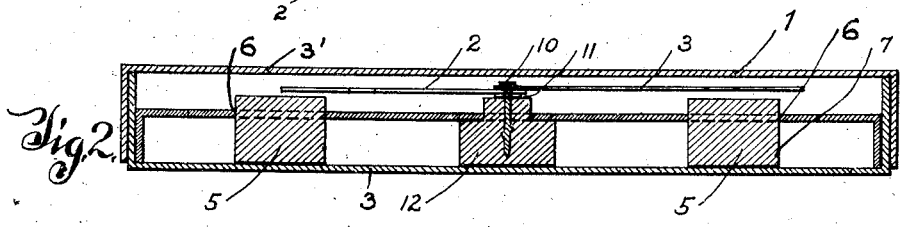
Figure 3:
Figure 4:
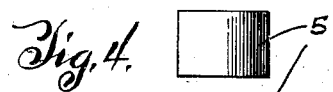
Figure 5:
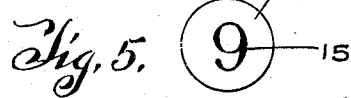

Figure 1 is a top plan view of my device.
Fig. 2 is a section on line 2—2, Fig. 1.
Fig. 3 is a detail plan view of a block used in the device.
Fig. 4 is a side elevation thereof, and
Fig. 5 is a reverse plan view of another block.

Like reference characters indicate like parts throughout the following specification and in the several views in the drawings in which—

1 indicates a box, 2 a false bottom therein, 3 the bottom of the box and 3' the cover thereof. The member 2 is provided with a series of annularly disposed openings 6 to receive the cylindrical blocks 5, which are of a depth to seat on the bottom of the box and project above the surface of the member 2 in order that they may be readily removed from said openings 6. These blocks are numbered to 12, and have the Arabic characters 15, 1 to 12 provided on one surface and the Roman characters 16, 1 to 12 provided on the reverse surface thereof. It will be noted that the characters, however, of each block are interchangeable, so that the same number will not appear on each block. The face of the member 2, after the insertion of the twelve blocks 5 in the openings 6, in numerical order as illustrated in Fig. 1, simulates the face of a clock.

12 is a support for the center of the false bottom 2, and is provided with a reduced upper end 11, which projects through an opening in said member 2. Mounted on the post 11 by means of a pin 10 is a pair of indice hands 13 and 14 which are freely revoluble.

The purpose of the device is for a child to assort the blocks 5 and properly place them in openings 6 to represent a correct figure of a clock dial. After this is done in Arabic characters the next step is to arrange the blocks in proper order with their Roman faces uppermost. After the child has learned these characters correctly and their correct position relative to the clock face, he next spins the hands with the purpose of learning the time indicated by the hands when they become at rest. Several children can use this device as a game. When the first child makes an error the next one proceeds with the game until he makes an error, etc. By means of this simple device children may quickly and readily learn to tell time, while at the same time they amuse themselves, thus, the study of the clock's face will not become irksome or appear in the form of a task.

The box and bottom 2 may be formed of box or paper board and the blocks of wood, while the characters may be stamped directly on the surfaces of said members, or be printed on paper and pasted on said surfaces. This will make the device very inexpensive, in order that it can be sold at a very small cost. It may also be made more expensive if desired.

Having now described my invention that which I claim to be new and desire to secure by Letters Patent is—

1. A combined educational and amusement device consisting of a box having a false bottom with a series of twelve radially arranged holes, and a series of twelve blocks adapted to be seated in said holes to simulate a clock's face.

2. A combined educational and amusement device consisting of a box having a false bottom with a series of twelve radially arranged holes to simulate a clock's face and a series of twelve blocks adapted to be seated in said holes, said blocks projecting above the surface of said false bottom.

3. A combined educational and amusement device consisting of a box having a false bottom with a series of twelve radially arranged holes, a series of twelve blocks adapted to be seated in said holes to simulate a clock's face, said blocks projecting above the surface of said false bottom, a central support for said false bottom having a reduced portion projecting through an opening therein and indice hands pivotally mounted upon said reduced portion.

4. A combined educational and amusement device consisting of a box having a false bottom with a series of twelve radially arranged holes, a series of twelve blocks adapted to be seated in said holes to simulate a clock's face, said blocks projecting above the surface of said false bottom, a central support for said false bottom having a reduced portion projecting through an opening therein and indice hands pivotally mounted upon said reduced portion, said blocks having Roman characters from 1 to 12 pivoted, one to each block successively on one surface thereof.

5. A combined educational and amusement device consisting of a box having a false bottom with a series of twelve radially arranged holes, a series of twelve blocks adapted to be seated in said holes to simulate a clock's face, said blocks projecting above the surface of said false bottom, a central support for said false bottom having a reduced portion projecting through an opening therein and indice hands pivotally mounted upon said reduced portion, said blocks having Roman characters from 1 to 12 pivoted, one to each block successively on one surface thereof, the other surfaces of said blocks having the Arabic characters from 1 to 12 similarly arranged thereon.

In testimony whereof I affix my signature in the presence of two witnesses.

ROBERT J. LEWERS.

Witnesses:
   ANTON LABRIOLA,
   HARRY ENGELTER.